United States Patent
Tumanov

(10) Patent No.: US 10,158,903 B2
(45) Date of Patent: Dec. 18, 2018

(54) DETECTION OF ITEMS IN A HOME

(71) Applicant: ECHOSTAR UKRAINE L.L.C., Kharkiv (UA)

(72) Inventor: Aleksey Tumanov, Kremenchuk (UA)

(*) Notice: Subject to any disclaimer, the term of this patent is extended or adjusted under 35 U.S.C. 154(b) by 0 days.

(21) Appl. No.: 15/508,070

(22) PCT Filed: Sep. 2, 2014

(86) PCT No.: PCT/UA2014/000095
§ 371 (c)(1),
(2) Date: Mar. 1, 2017

(87) PCT Pub. No.: WO2016/036338
PCT Pub. Date: Mar. 10, 2016

(65) Prior Publication Data
US 2017/0289606 A1    Oct. 5, 2017

(51) Int. Cl.
*H04N 21/4223*   (2011.01)
*H04N 21/25*     (2011.01)
*H04N 21/258*    (2011.01)
*H04N 21/2668*   (2011.01)
*H04N 21/442*    (2011.01)
(Continued)

(52) U.S. Cl.
CPC ..... *H04N 21/4223* (2013.01); *G06Q 30/0242* (2013.01); *H04N 21/251* (2013.01); *H04N 21/25891* (2013.01); *H04N 21/2668* (2013.01); *H04N 21/44213* (2013.01); *H04N 21/4532* (2013.01); *H04N 21/812* (2013.01); *G06Q 30/0269* (2013.01)

(58) Field of Classification Search
CPC ......... H04N 21/4223; H04N 21/25891; H04N 21/2668; H04N 21/44213; H04N 21/4532; H04N 21/812; G06Q 30/0242; G06Q 30/0269
See application file for complete search history.

(56) References Cited

U.S. PATENT DOCUMENTS

2004/0161133 A1   8/2004   Elazar et al.
2005/0018216 A1   1/2005   Barsness et al.
(Continued)

FOREIGN PATENT DOCUMENTS

WO    2013-165927 A2    11/2013
WO    2016-036338 A1    3/2016

OTHER PUBLICATIONS

International Search Report and Written Opinion of PCT/UA2014/000095.

*Primary Examiner* — Randy A Flynn
(74) *Attorney, Agent, or Firm* — Kilpatrick Townsend & Stockton LLP

(57) ABSTRACT

Various arrangements for detecting items in home are presented. Imaging devices may capture images of a user's home. The images may be analyzed and compared against a user approved list of item definitions. Using the definitions, items, brands, trademarks, and the like may be identified in the images. The items identified in the images may be used to determine preferences of a user and provide targeted marketing content using the television receiver. In some cases, analysis of items in a home may be used to determine the effectiveness of marketing content by determining causality or correlations between marketing content viewed by a user and items in the home.

20 Claims, 7 Drawing Sheets

(51) Int. Cl.
    *H04N 21/45*       (2011.01)
    *H04N 21/81*       (2011.01)
    *G06Q 30/02*      (2012.01)

(56) References Cited

U.S. PATENT DOCUMENTS

| | | | |
|---|---|---|---|
| 2006/0122886 A1 | 6/2006 | McKay | |
| 2008/0005105 A1* | 1/2008 | Lawler | G06F 17/3002 |
| 2010/0131356 A1* | 5/2010 | Stevens | G06Q 30/02 705/14.44 |
| 2010/0262486 A1* | 10/2010 | Matsunaga | H04N 21/262 705/14.43 |
| 2011/0247042 A1* | 10/2011 | Mallinson | H04N 21/8352 725/86 |
| 2012/0069131 A1* | 3/2012 | Abelow | G06Q 30/02 348/14.01 |
| 2012/0072936 A1* | 3/2012 | Small | G06Q 30/00 725/10 |
| 2012/0130800 A1* | 5/2012 | Pradeep | G06Q 30/02 705/14.41 |
| 2013/0076788 A1* | 3/2013 | Ben Zvi | G06T 19/006 345/633 |
| 2014/0019227 A1* | 1/2014 | Walker | G06Q 30/0244 705/14.43 |
| 2014/0082648 A1* | 3/2014 | Tanner | H04N 21/2407 725/14 |
| 2014/0130076 A1 | 5/2014 | Moore et al. | |
| 2014/0161305 A1* | 6/2014 | Lee | H04N 21/44218 382/103 |
| 2015/0142606 A1* | 5/2015 | Hafeez | G06Q 30/0625 705/26.62 |
| 2015/0256899 A1* | 9/2015 | Chand | H04N 21/812 725/34 |

* cited by examiner

DETECTION OF ITEMS IN A HOME

CROSS-REFERENCE TO RELATED APPLICATIONS

This application is a U.S. National Stage of International Application No. PCT/UA2014/000095, filed on Sep. 2, 2014, which is hereby incorporated by reference in its entirety.

BACKGROUND

Marketing content is often tailored to particular types of consumers or consumer groups. Consumers may be grouped based on demographic data such as age, income, television viewing preferences, or education. However, even if marketing material is tailored to specific consumer profiles or groups, it is still difficult to assess if the marketing content had an effect or if assumptions based on the grouping of the consumer are accurate for each individual consumer.

SUMMARY

Systems, methods, devices, and computer-program-products for customer preference detection. For example, a method may include or comprise activating an imaging device, the imaging device positioned to image an area of a home in view of a television; imaging the area using the imaging device; accessing a database of image signatures corresponding to identifiable items; analyzing images for one or more identifiable items using the database of image signatures; accessing a user preference for image analysis; filtering the one or more identifiable items based on the user preference; and transmitting a list of filtered identified items to a service provider. Additionally, or alternatively, the method may include or comprise receiving marketing content based on the list filtered identified items, wherein at least some of the marketing content is formatted for display on the television. Additionally, or alternatively, the list of filtered identified items may include a user profile and a time stamp associated with each item in the list of filtered identified items. Additionally, or alternatively, the method may include or comprise tracking a history of received marketing content and the list of filtered identified items; and determining a causality score between the marketing content and filtered identified items. Additionally, or alternatively, the identified items may include at least one of a product barcode, trademark, or product logo. Additionally, or alternatively, the identified items may include product shapes. Additionally, or alternatively, the imaging device may include at least one of a depth sensor, a camera, or a microphone array.

DETAILED DESCRIPTION

Figure 1:
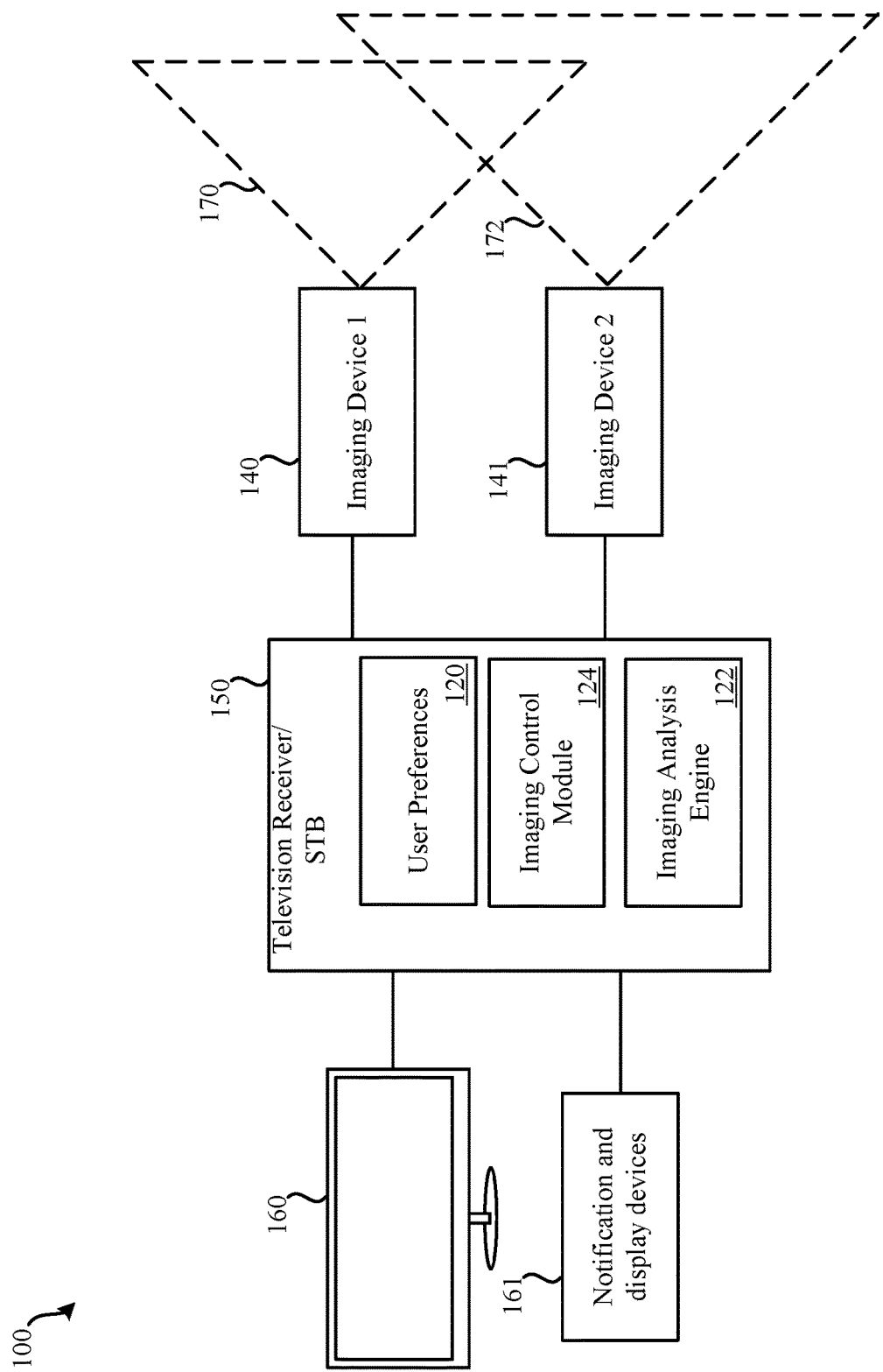
FIG. 1 illustrates an embodiment of a system for item detection in a home.

Imaging devices may be used to image an area of or within a home. Images captured by an imaging device may be analyzed or processed to identify items in a home. Images may be analyzed to identify products, brands of products, product barcodes, brand names, trademarks, shapes or specific products, and the like. The images may be analyzed to determine what products or services a user typically uses, changes in products, changes in preferences of a user, life style changes, and the like.

The imaging device may be coupled to a television set-top-box (STB) or a computer. A STB, for example, may receive captured image and analyze the images for specific products or services located in the home. Information about the identified products or services may be used to tailor marketing content presented to the user. Marketing content, such as television advertisements, advertisement banners displayed on the television, or other marketing content may be tailored based on what items or products have been identified in the user's home. Marketing content may be complimentary to the products that a user already has in the home. For example, if a user already has products of a specific brand, marketing content that educates the user about new products of the brand may be selected and presented to the user. In another example, if a user already had products of a specific brand, marketing content may include advertisements for competing brands.

Imaging devices may include cameras that capture digital photos of an area. The images may be analyzed using image recognition algorithms. Imaging devices may include depth cameras, sonar devices, scanning lasers, and/or the like which may be used to get a three dimensional image of an area. The three dimensional image may be analyzed to identify specific shapes of containers for products or other items. Some products, such as a bottle of soda may have a shape that is unique to a specific brand. Imaging devices may also include any number of infrared cameras, scanning cameras, and the like. An imaging device may include more than one camera, depth camera, scanning laser, and the like. Sensor data from multiple cameras and sensors may be analyzed in parallel or combined for analysis.

Imaging device may be positioned near, or may be integrated into a television, set-top-box (STB), computer, or other devices. The imaging device may be configured to image an area of a user's home. An imaging device positioned on a television, for example, may image a living room area of a home. In some cases, a television may be located in a kitchen or a bedroom of a home which may allow the imaging device to capture images of the kitchen or bedroom.

Images from imaging devices may be analyzed to detect only products that are listed in a definition library or database. A definition library may include templates, information, or other descriptors of detectable items. Images may be analyzed according to the descriptors. If a pattern, shape, or other characteristic matches that of an item in the database the item may be marked as detected in the home. The database of items may be limited to an approved list of products or items the user is willing to accept for detection.

Images from imaging devices may, in some cases, be processed using character recognition algorithms to detect words, letters, and other marks indicative of a brand name or product. Algorithms to detect product barcodes, or other machine readable codes located on products may be analyzed and detected in images. Barcode data may be used to search for products, brands, prices, and the like of the associated products or items.

Imaging device, types of images captured by the imaging device, the analysis performed on the captured images may be configurable by a user. In some examples, setting may allow a user to configure the field of view of the imaging device. Users may limit the field of view of the imaging device or mark areas of a home or areas of the field of view of an imaging device that should not be analyzed. In one embodiment, images captured by the imaging device may be displayed on the television or other display device communicatively coupled to the imaging device. A user may outline areas of the image that should not be analyzed or used to identify items. A user may utilize a pointing device such as a computer mouse, touch panel, and the like to draw an outline around an area in the captured image that is off limits for analysis. A user may specify the times of day, week, or year the imaging device may capture images.

The types of items recognized by the imaging device may be configurable by the user In some examples, the user may select one or more specific databases of items for recognition. The user may have options to select databases with specific types of item definitions that are used for item identification. Databases for kitchen items, soft drinks, clothes, and the like may be selectable by the user thereby configuring the system to detect only the items in each database.

In addition or instead of limiting detection to specific databases of items, a user may define filters or restrictions on the detected items. Filters that will prevent detection or reporting of specific products or items may be defined by the user. In some cases, for example, a user may not want the system to detect the brands of beer the user has in the home. The user may specify a filter to prevent detection or reporting of any items related to alcohol.

In some cases the user may be presented with incentives for selecting specific databases of items. A kitchen cleaning product company may, for example, provide the user with free or discounted products for selecting to detect products from the brand. In some cases the system may be configurable with an "unlimited detection" option thereby allowing the system to detect all possible items.

In some examples the processing of captured images from the imaging device may be performed locally on the user's computer, STB, or other device. Algorithms for detecting items may be executed on the user's device and used to generate a list of detected items. The list of detected items may be further filtered or analyzed by a user. The filtered list may be reported to a service provider. In examples the system may have a strict security policy, firewall, or other mechanisms for preventing any additional information from being transmitted externally from the user's device. Output of the user device may be monitored to prevent any raw images captured by the imaging device or other data other than a list of approved items from being transmitted from the user's device.

In some examples the processing of captured images from the imaging device may be performed remotely. Images captured by an imaging device may be transmitted, via a secure connection, to a service provider. The service provider may analyze the images to detect items. Identified item may be used to tailor marketing content presented to the user. Based on the detected items the user may receive customized advertisements such as TV commercials, banner ads, and the like that may be displayed on a television. Based on the items detected in a home advertisement brokers may provide advertisements pertinent to the user.

In some examples, a list of identified items in a home may be recorded and saved. In some cases a historical record of identified items in a home may be saved at a service provider and/or at a user's device such as the STB. The historical record of identified items may include the items, date and/or time of when the items were identified. In some cases the items may be attributed to a specific user or person in a household. Identified items may be associated with a user profile of a television system. For example, if an item was detected during the same time a user profile was active on a television receiver the item may be associated with user profile.

In some examples the historical data of identified items may be analyzed to detect life changes, trends, and/or change in user product preferences of the user. For example, changes in items found in a home may signal a life change. The sudden appearance of items or brands of items related to children or babies may be used to infer that the household may have had a new addition to the family. In that case, marketing material related to baby products may be appropriate and relevant to the users.

In another example, analysis of identified historical products may reveal a change to a healthier lifestyle. A historical trend or increased detection of natural, organic, or other low calorie food products may mean users are trying to lose weight, eat healthier, and the like. In that case, marketing content related to healthier foods may be useful to the user. Marketing content related to weight loss, organic foods, and the like may be directed to the user.

In some examples a history or a lists of marketing content, marketing campaigns, and the like presented to the user may be recorded and saved. The effectiveness of the marketing content presented to the user may be determined by analyzing the history of identified items in a user's home.

In some examples, the effectiveness of the marketing content on a user may be determined by calculating correlations between the marketing content presented to the user and the items found in a user's home. Effectiveness of marketing content may be determined by comparing the expected response of a marketing content on a user with the observed effect. Observed effect may be determined directly from the items detected in a user's home. If marketing content was directed to specific products or brands, the presence of the products in the home may mean that the marketing content was effective.

Marketing content may be assigned an effectiveness score. The effectiveness score may factor in the time between the marketing content and the time until a related change in the items in a home is observed. The score may depend on the frequency or number of advertisements shown to the user. In some cases the effectiveness score may further depend on the number of items the targeted items found in the home after the marketing content. In some examples the effectiveness score may be a correlation score. In some examples, the effectiveness score may include a causality determination. Causality may be analyzed to determine if or what changes were caused by the marketing content.

In some cases, the effectiveness of marketing may be observed indirectly from the items detected in a home. For example, marketing content may include public service announcements directed to consumers. Public service announcements may be focused on encouraging customers in eating healthier, less sugar, or the like. Changes in the types of products that are detected in the home may indicate a shift in healthier lifestyle. The types of food products in a home may be analyzed over time to determine if the food items have less sugar, less fat, more nutritious, or the like.

In some examples, a list of items in a home may be recorded and saved along with the television or other programming being viewed or active on the television or other display device in the home. The coincidence or correlation between items in a home and the programming content being watched by users in a home may be determined to identify the products and preferences of users watching specific programs, types of programs, and the like. Correlations between programming types and types of items or user preferences may be used to pair marketing content with specific types of programming. In some cases, some products may be identified only during specific programming. For example, during some types of programming content, such as sporting events, brands related to alcoholic beverages may be detected. Beer or alcoholic beverages may normally not be in view of the imaging device unless a user is drinking the beverage. Identifying programming content that is associated with beer consumption may be useful for targeting the users with advertising content related to alcoholic beverages. In another example, brands of clothes may be correlated with specific programming content according to different users viewing the programming content.

In examples, lists of identified items may be used to provide incentives for the user to purchase more of the items. A service provider may transmit data related to identified items to manufacturers of products or other entities allowing them to provide coupons or other incentives for continuing to use the identified items.

FIG. 1 shows an embodiment of a system for item detection in a home that includes a STB 150 or television receiver. The system 100, may include a television receiver that is directly or indirectly coupled to one or more display devices 160 such as a television or a monitor. The television receiver may be communicatively coupled to other display and notification devices 161 mobile phones, tablets, and the like. The television receiver may be configured to receive readings from one or imaging devices 140, 141. The imaging devices 140, 141 may be wired to the television receiver 150. In some cases the imaging device may connect wirelessly to the television receiver 150 via one or more wireless protocols and technologies which may include, for example, WiFi, CAN bus, Bluetooth, I2C bus, ZigBee, Z-Wave and/or the like. Captured images from the imaging device may be received via a wireless network or even from the cloud. Imaging devices may capture and upload images to the cloud. Imaging devices may be part of other devices, consoles, or home equipment. Cameras utilized in home security or gaming consoles may be utilized to capture images. The images may be received by the television receiver.

In examples the television receiver may include an imaging control module 124. The imaging control module may control the imaging devices 140, 141. The control module may include protocols for communicating and interpreting image data from each of the imaging devices. The imaging control module 124 may control the timing of when the imaging devices are active. The imaging control module 124 may read user preferences 120 to determine restrictions on the activity of the imaging devices.

In examples, multiple imaging devices may image one area. The field of view 170, 172 of each imaging device may be independent. In some cases, the field of view 170, 172 of each imaging device may overlap. The overlap between the field of views may provide additional information. Each imaging device may provide for a different angle of view of an area of a home. The imaging devices may be based on the same imaging technology. In some cases multiple imaging devices configured to have the field of view of the same area of a home may be based on different imaging technologies. One imaging device may provide for infrared imaging, a second imaging device may provide depth information, while a third may provide color information.

The television receiver may include an imaging analysis engine 122. The imaging analysis engine 122 may receive captured images from the sensors and analyze the images to determine items such as products, logos, trademarks, text, and the like. The imaging analysis engine 122 may read data from user preferences 120 to identify, if any, databases or lists of detectable items approved by the user. The databases of items may include templates of item definitions that may include shapes, logos, text, templates, and other information that may be used by the imaging analysis engine 122 to detect the items. The imaging analysis engine 122 may user a variety of image recognition algorithms for identifying items. Optical character recognition, shape analysis, border analysis, and the like may be used to identify items.

Various techniques may be used to improve the performance of item detection. In one example, the analysis engine may collect baseline or background images. Background or baseline images may be captured over time during different times of the day or week. Background images may be analyzed to identify all the items in the images. New captured images may be compared against background images to identify changes in the images. In one example a difference between the background image and a new captured image may be taken. Differences in the background images and the new images may reveal areas that have changed or have new items. The image analysis engine may be configured to focus on the areas of the captured images that have been identified to be different over the baseline or background images.

In examples, imaging devices may be configurable or adjustable. In some cases the imaging devices may be configurable or adjustable for specific applications or user restrictions. In some cases the imaging devices may be electronically adjustable from commands or instructions sent from the television receiver. For example, some parts of the images captured by the imaging device may be designated as restricted by the user. The television receiver may configure the imaging device to not image or black out the pixels that cover the area that is restricted by the user preventing images of the restricted area from even leaving the imaging device.

During operation of the system 100, readings from the imaging device may be collected, stored, and/or analyzed in the television receiver 150. In examples, analysis of the captured images may be determined by user preferences 120 stored in the television receiver 150. The user preferences may define how the images are captured, how often, what periods of time, what resolution, and other characteristics. The user preferences may specify specific imaging device settings. The user preferences may define how the captured images are processed and/or analyzed. For example, for some applications, image analysis may include performing time based or historical analysis to determine trends in detected items.

In examples the television receiver or the imaging devices may be configured to provide results, status, analysis, and configuration data details to a user. An indication may be provided to the user each time an image is captured. Auditory, visual, and tactile communication methods may be used. Display devices such as a television or a tablet may be used to show information related to the imaging and analysis.

Display devices such as television, laptops, tablets, and the like may be used for presenting to the user interfaces that may be used to further configure or change user preferences. An interface may include one or more options, selection tools, navigation tools for modifying the user preferences in turn may change activity of the imaging devices. Display interfaces may be used to select and/or download new item databases or definitions for detection. A catalog of pre-defined databases of items may be available to a user. Each database may include incentives for use such as coupons, free or discounted products, and the like. A user may select, load, and/or install an item database on the television receiver by making a selection using in part the display device. The detected list of items may be transmitted to a service provider. The service provider may analyze the detected items and provide marketing content based in part on the detected items.

Figure 2:
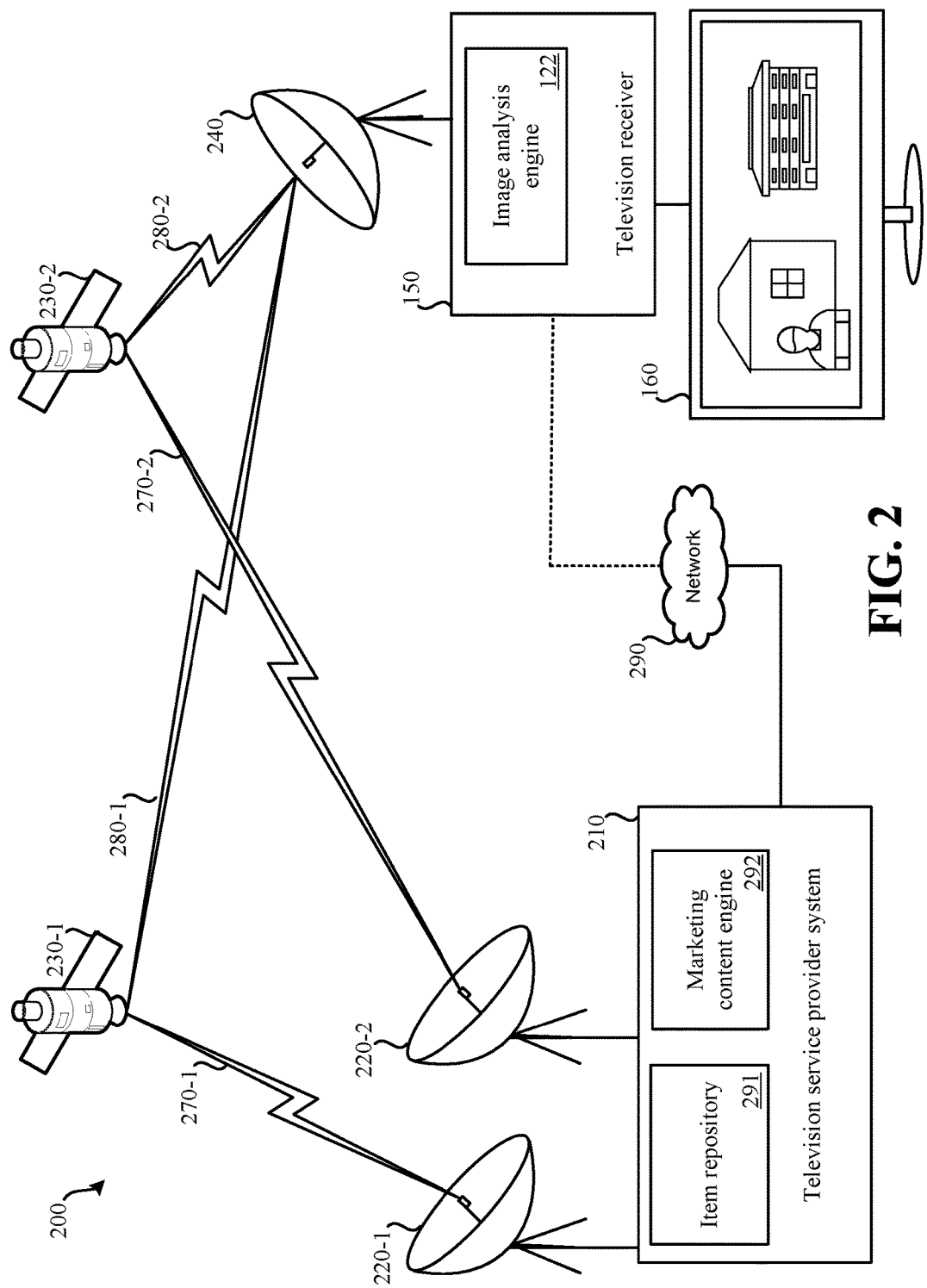
FIG. 2 illustrates an embodiment of a satellite television distribution system.

Detection of items may include television receivers for a satellite based television system, an embodiment of which is illustrated in FIG. 2. Satellite television distribution system 200 may include: television service provider system 210, satellite transmitter equipment 220, satellites 230, satellite dish 240, television receiver 150, and display device such as a television 160. Alternate examples of satellite television distribution system 200 may include fewer or greater numbers of components. While only one satellite dish 240, television receiver 150, and display device 160 (collectively referred to as "user equipment") are illustrated, it should be understood that multiple (e.g., tens, thousands, millions) instances of user equipment may receive television signals from television service provider system 210 via satellites 230.

Television service provider system 210 and satellite transmitter equipment 220 may be operated by a television service provider. A television service provider may distribute television channels, on-demand programming, programming information, marketing content, and/or other content/services to users. In some examples the television service provider system 210 may distribute or provide a gateway or library of item databases for item detection.

Television service provider system 210 may receive feeds of one or more television channels from various sources. Such television channels may include multiple television channels that contain at least some of the same content (e.g., network affiliates). To distribute television channels and marketing content for presentation to users, feeds of the television channels may be relayed to user equipment via multiple television distribution satellites. Each satellite may relay multiple transponder streams. Satellite transmitter equipment 220 (220-1, 220-2) may be used to transmit a feed of one or more television channels from television service provider system 210 to one or more satellites 230. While a single television service provider system 210 and satellite transmitter equipment 220 are illustrated as part of satellite television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite dish of satellite transmitter equipment 220 may be used for communication with satellites in different orbital slots.

Satellites 230 may be configured to receive signals, such as streams of television channels or marketing content, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels and/or configuration data transmitted as packetized data. For example, a single transponder stream may be a serial digital packet stream containing multiple television channels. Therefore, packets for multiple television channels may be interspersed. In examples a stream of a television channel may be referred to as a programming stream. In some cases several television channels may be combined into one stream such as in a transponder stream. In this descriptions transponder streams and programming streams may be used synonymously.

Multiple satellites 230 may be used to relay television channels from television service provider system 210 to satellite dish 240. Different television channels and marketing content may be carried using different satellites. Different television channels and/or configuration data may also be carried using different transponders of the same satellite. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 240 may be a piece of user equipment that is used to receive transponder streams from one or more satellites, such as satellites 230. Satellite dish 240 may be provided to a subscriber for use on a subscription basis to receive television channels provided by the television service provider system 210, satellite transmitter equipment 220, and/or satellites 230. Satellite dish 240, which may include one or more low noise blocks (LNBs), may be configured to receive transponder streams from multiple satellites and/or multiple transponders of the same satellite. Satellite dish 240 may be configured to receive television channels via transponder streams on multiple frequencies. Based on the characteristics of television receiver 150 and/or satellite dish 240, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 240 may be one or more television receivers. Television receivers may be configured to decode signals received from satellites 230 via satellite dish 240 for output and presentation via a display device, such as a television 160. A television receiver may be incorporated as part of a television or may be part of a separate device, commonly referred to as a set-top box (STB). Television receiver 150 may decode signals received via satellite dish 240 and provide an output to television 160. A television receiver is defined to include set-top boxes (STBs) and also circuitry having similar functionality that may be incorporated with another device. For instance, circuitry similar to that of a television receiver may be incorporated as part of a television, and/or such circuitry can be implemented in multiple appliances. While FIG. 1 illustrates an embodiment of television receiver 150 as separate from television 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). The television receiver 150 may output to a display device 160 one or more interfaces for monitoring, configuring, or controlling monitoring and control applications. In many examples, display device 160 is a television. Display device 160 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite dish 240. Transponder stream 280-2 represents a transponder stream signal between satellite 230-2 and satellite dish 240. Each of transponder streams 280 may contain one or more different television channels and/or information related to configuration data, which may be at least partially scrambled. For example, transponder stream 280-1 may be a first transponder stream containing a first group of television channels, while transponder stream 280-2 may be a second transponder stream containing a different group of television channels. Television channel or marketing content received as part of a transponder stream may be presented to the user or stored in a storage medium as part of DVR functionality for later retrieval.

Network 290 may serve as a secondary communication channel between television service provider system 210 and television receiver 150. Via such a secondary communication channel, bidirectional exchange of data may occur. Data may be transmitted to television service provider system 210 from television receiver 150 via network 290. Data may also be transmitted from television service provider system 210 to television receiver 150 via network 290. Network 290 may be the Internet. The network 290 may be used to transfer lists of detected items from the image analysis engine 122 of the television receiver 150. The television service provider system 210 may maintain a history of the detected items in an item repository 291. The detected list of items in the item repository 291 may be analyzed using the marketing content engine 292 to determine marketing content appropriate for the users associated with the television receiver 150.

Television service provider system 210 may directly provide advertisements to the television receiver according to the determination made by the marketing content engine 292. In some cases, various marketing content types may be always streamed or sent by the television service provider system 210 over the satellites to the television receiver 150. The television service provider, based on the determination from the marketing content engine 292, may transmit to the television receiver an indication which marketing content to display to the user. The indication may be sent via the network 290.

Figure 3:
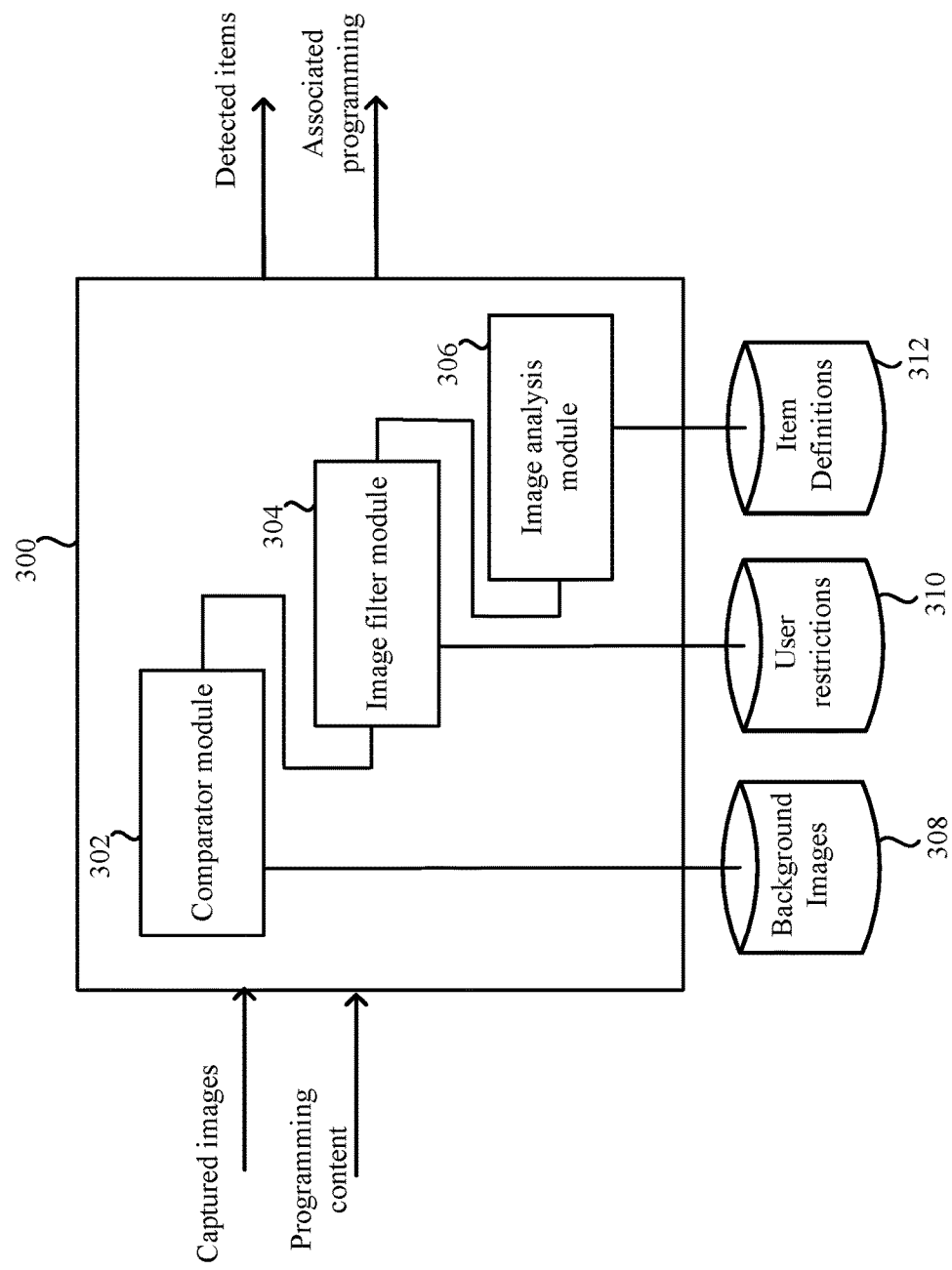
FIG. 3 illustrates an embodiment of an image analysis engine.

FIG. 3 shows an example embodiment of an image analysis engine 300 configured for item detection using a television receiver. The image analysis engine 300 may receive captured images from the imaging devices as well as programming content that may be displayed or actively viewed using the television receiver. The image analysis engine 300 may receive data from one or more databases and may include data related to background images 308, user restrictions 310, and item definitions 312. The image analysis engine 300 may process received captured images using the comparator module 302, the image filter module 304, and the image analysis module 306.

The comparator module 302 may be configured to received captured images and determine if the captured images have changed since last capture or compared to baseline background images. The comparator may compare, take the difference, or perform other operations between captured images and one or more background images from the background images database 308. The comparator module 302 may determine if the at least 15% or at least 2% of the captured image differs from the background images. If at least 2% differs the comparator module 302 may identify the areas of the captured image that differ and pass the processing of the image on to the image filter module 304.

The image filter module 304 may receive data from the user restriction database 310 to determine if the any of the areas identified by the comparator module 302 may be restricted from analysis by the user. The image filter module 304 may filter areas of the image determined to be restricted by the user. The image filter module 304 may filter areas of the image based on the coordinates of the image. User restrictions may, for example, include restrictions that specify that the lower right corner of the captured image should not be analyzed for items. The area of the image may be further filtered by the image filter module 304 to prevent processing. If, after filtering, the captured image still contains at least 2% of an area that differs from the background images, the captured image may be processed by the image analysis module 306.

The image analysis module 306 may use item definitions 312 to determine if any products may be identified in the captured images. The image analysis module 306 may use the item definitions to recognize text, logos, trademarks, or other identifiers of an item in the image. The image analysis module 306 may generate a list of detected items. The list may include the location of the detected item, the time the item was detected, associated programming content that was being watched when the item was detected, and the like. The data and the list of items may be provided to the service provider.

Figure 4:
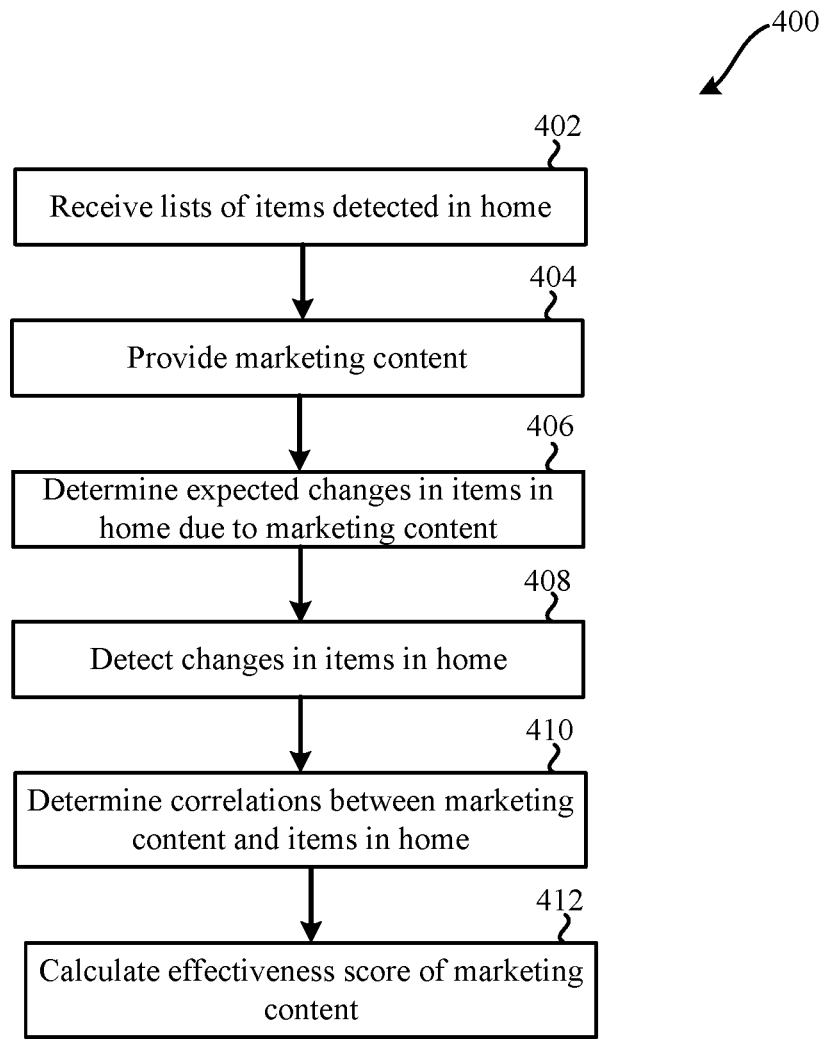
FIG. 4 illustrates an embodiment of a method for determining effectiveness of marketing content provided to a user.

FIG. 4 illustrates an embodiment of a method 400 for determining effectiveness of marketing content provided to a user. Method 400 may be performed using the systems previously described. For instance, satellite television distribution system 100 of FIG. 1. Components of such systems may be implemented using hardware, software, and/or firmware. Further, the performance of method 400 may include one or more instances of the components of computer system 700 of FIG. 7.

At block 402 lists of detected items in a home may be received. The list of detected items may be used as a baseline for items that the user normally has at home or may be used to determine the user's preferences. At block 404, the marketing content may be provided to the user. The marketing content may be, at least in part, based or selected based on the items detected in the user's home. At block 406, expected changes in the items in the user's home resulting from the user viewing the marketing content may be determined. For example, if the marketing content is for a specific brand of product, the expected or desired result of the marketing content being viewed by the user would be more items related to the brand.

At block 408 items in the home of the user may be detected again and any changes in the items may be identified. At step 410 correlations between the changes in the detected items and the expected changes due to the marketing content may be determined. At block 412 effectiveness score may be assigned to the marketing content. The effectiveness score may reflect if the marketing content resulted in the desired effect. The higher the score the more effective the marketing content. The effectiveness score may be used to keep track and eliminate ineffective marketing content.

Figure 5:
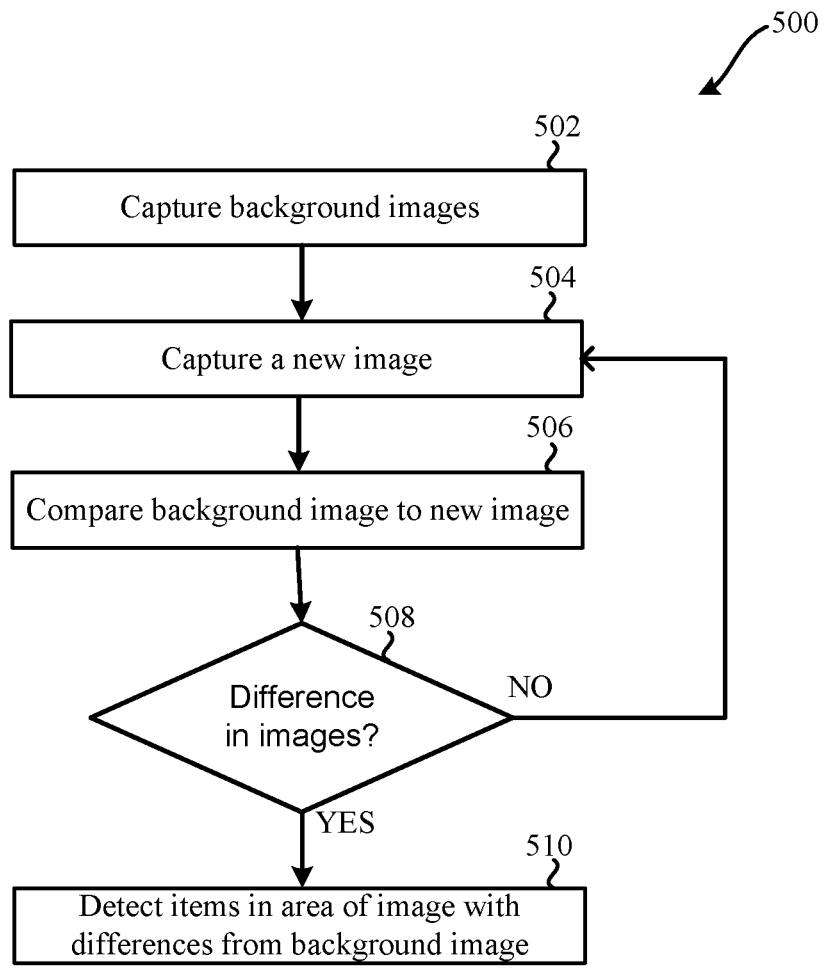
FIG. 5 illustrates an embodiment of a method for analyzing captured images to identify items.

FIG. 5 illustrates an embodiment of a method 500 for analyzing captured images to identify items. Method 500 may be performed using the systems previously described. For instance, satellite television distribution system 100 of FIG. 1 or the image analysis engine 300 of FIG. 3 may be used. Components of such systems may be implemented using hardware, software, and/or firmware. Further, the performance of method 500 may include one or more instances of the components of computer system 700 of FIG. 7.

At block 502 background images may be captured. Background images may be a designated images that are captured during a setup or configuration phase by a user. The background images may represent a baseline of normal items in a home such as furniture or appliances. In some examples the background images may be captured by the system over time and may be an average or a combination of one or more images.

At block 504 a new image may be captured by the imaging device. At block 506 the new image may be compared against one or more background images. The comparison may include taking a difference between the new image and the background images. In some examples the comparison may include other operations. The comparison may identify differences in the new image and the background images. At block 508, if no differences during the comparison are identified between the new image and background image the process may loop back to block 504. If there are no differences then the new image does not have any new or different items then the background image and does not need to be further analyzed.

At block 508, if differences in the new captured image and the background image are identified the process may proceed to block 510. At block 510, the system may detect items in the new captured image. In some examples the item detection may occur only in or near the areas of the new image that are different from the background images.

Figure 6:
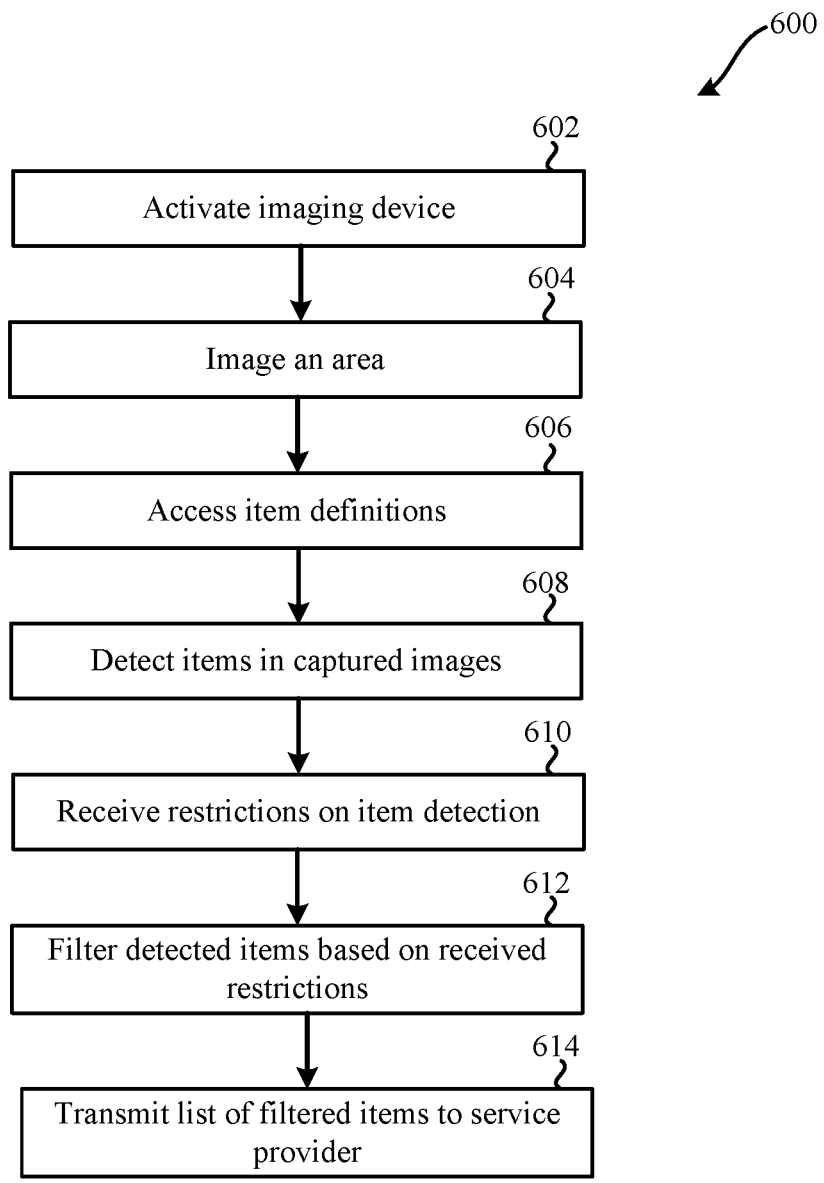
FIG. 6 illustrates another embodiment of a method for analyzing captured images to identify items.

FIG. 6 illustrates an embodiment of a method 600 for analyzing captured images to identify items. Method 600 may be performed using the systems previously described. For instance, satellite television distribution system 100 of FIG. 1 or the image analysis engine 300 of FIG. 3 may be used. Components of such systems may be implemented using hardware, software, and/or firmware. Further, the performance of method 600 may include one or more instances of the components of computer system 700 of FIG. 7.

At block 602 one or more imaging devices may be activated and used to image an area in block 604. At block 606 the system may access item definitions. The item definitions may be included in one or more databases of items allowed or approved by a user. At block 608 the system may try to detect the items with the item definitions in the captured images. At block 610 the system may receive or query additional user preferences. The user preferences may include additional restrictions on the detection of items in the images. The restrictions may include areas of an image that may be analyzed, types of products, and the like. In some cases the restrictions may override items that are defined as allowed in the item definitions. At block 612 items that do not meet the restrictions may be filtered and not marked as detected. The list of items after filtering may be transmitted to a service provider in block 614.

Figure 7:
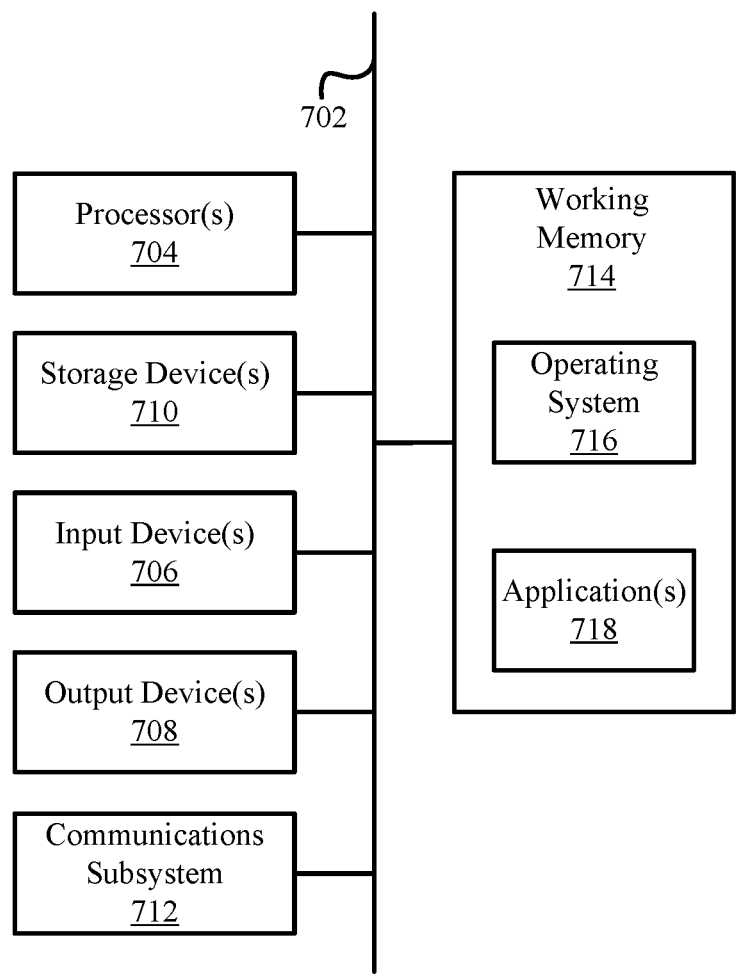
FIG. 7 illustrates an embodiment of a computer system.

FIG. 7 shows an example computer system or device 700 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIGS. 1-2.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for customer preference detection, comprising:
   receiving input corresponding to selection of user preferences including identification of permitted items;
   activating an imaging device, the imaging device positioned to capture images of an area of a home in view of a television;
   capturing a baseline image of the area using the imaging device;
   receiving input corresponding to selection of a field of view for the area;
   capturing a new image of the area;
   accessing a database of image signatures corresponding to identifiable items;
   detecting one or more identifiable items in the new image and present in the field of view using the database of image signatures, wherein detecting includes comparing the baseline image and the new image and filtering using the field of view;
   adding detected identifiable items to a detected item list;
   generating a filtered item list using the detected item list and the user preferences including the permitted items, the filtered item list including identifiable items from the detected item list that are permitted items;
   adding items from the detected item list to a historical detection list;
   transmitting the filtered item list to a service provider;
   receiving new marketing content from the service provider based on a preference change determined by comparing the historical detection list with a prior historical detection list; and
   outputting a signal for presentation of the new marketing content on the television.

2. The method of claim 1, further comprising:
   receiving further marketing content based on the filtered item list; and
   outputting a further signal for presentation of the further marketing content on the television.

3. The method of claim 1, wherein:
   the filtered item includes a user profile and a time stamp associated with each item in the filtered item list.

4. The method of claim 2, further comprising:
   tracking a history of the marketing content output for presentation on the television and items on the filtered item list; and
   determining a causality score between the marketing content and the items on the filtered item list.

5. The method of claim 1, wherein:
   identifiable items include at least one of a product barcode, trademark, product shape, or product logo.

6. The method of claim 1, further comprising:
   tracking programming output for presentation on the television;
   determining a correlation between a type of programming output for presentation on the television and items on the detected item list;
   receiving further marketing content based on the correlation; and
   outputting a further signal for presentation of the further marketing content on the television during presentation of further programming of the type of programming.

7. The method of claim 1, wherein the preference change corresponds to a change in types of identifiable items associated with a behavior change or a life change.

8. A non-transitory processor-readable medium for customer preference detection, the medium comprising processor-readable instructions configured to cause one or more processors to perform operations including:
   receiving input corresponding to selection of user preferences including identification of permitted items;
   activating an imaging device, the imaging device positioned to capture images of an area of a home in view of a television;
   capturing a baseline image of the area using the imaging device;
   receiving input corresponding to selection of a field of view for the area;
   capturing a new image of the area;
   accessing a database of image signatures corresponding to identifiable items;
   detecting one or more identifiable items in the new image and present in the field of view using the database of image signatures, wherein detecting includes comparing the baseline image and the new image and filtering using the field of view;
adding detected identifiable items to a detected item list;
user generating a filtered item list using the detected item list and the preferences including the permitted items, the filtered item list including identifiable items from the detected item list that are permitted items;
adding items from the detected item list to a historical detection list;
transmitting the filtered item to a service provider;
receiving new marketing content from the service provider based on a preference change determined by comparing the historical detection list with a prior historical detection list; and
outputting a signal for presentation of the new marketing content on the television.

9. The non-transitory processor-readable medium of claim 8, wherein the operations further include:
receiving further marketing content based on the filtered item list; and
outputting a further signal for presentation of the further marketing content on the television.

10. The non-transitory processor-readable medium of claim 8, wherein:
the filtered item list includes a user profile and a time stamp associated with each item in the filtered item list.

11. The non-transitory processor-readable medium of claim 9, wherein the operations further include:
tracking a history of marketing content output for presentation on the television and items on the filtered item list; and
determining a causality score between the marketing content and the items on the filtered item list.

12. The non-transitory processor-readable medium of claim 8, wherein:
the identifiable items include at least one of a product barcode, trademark, product shape, or product logo.

13. The non-transitory processor-readable medium of claim 8, wherein the operations further include:
tracking programming output for presentation on the television;
determining a correlation between a type of programming output for presentation on the television and items on the detected item list;
receiving further marketing content based on the correlation; and
outputting a further signal for presentation of the further marketing content on the television during presentation of further programming of the type of programming.

14. The non-transitory processor-readable medium of claim 8, wherein the preference change corresponds to a change in types of identifiable items associated with a behavior change or a life change.

15. A television receiver, comprising:
one or more processors;
a memory communicatively coupled with and readable by the one or more processors and having stored therein processor-readable instructions which, when executed by the one or more processors, cause the one or more processors to perform operations including:
receiving input corresponding to selection of user preferences including identification of permitted items;
an imaging device, the imaging device positioned to capture images of an area of a home in view of a television;
capturing a baseline image of the area using the imaging device;
receiving input corresponding to selection of a field of view for the area;
capturing a new image of the area;
accessing a database of image signatures corresponding to identifiable items;
detecting one or more identifiable items in the new image and present in the field of view using the database of image signatures, wherein detecting includes comparing the baseline image and the new image and filtering using the field of view;
adding detected identifiable items to a detected item list;
generating a filtered item list using the detected item list and the generating a filtered item list using the detected item list and the preferences including the permitted items, the filtered item list including identifiable items from the detected item list that are permitted items;
adding items from the detected item list to a historical detection list;
transmitting the filtered item list to a service provider;
receiving new marketing content from the service provider based on a preference change determined by comparing the historical detection list with a prior historical detection list; and
outputting a signal for presentation of the new marketing content on the television.

16. The television receiver of claim 15, wherein the operations further include:
receiving further marketing content based on the filtered item list; and
outputting a further signal for presentation of the further marketing content on the television.

17. The television receiver of claim 15, wherein:
the filtered item list includes a user profile and a time stamp associated with each item in the filtered item list.

18. The television receiver of claim 16, wherein the operations further include:
tracking a history of the marketing content output for presentation on the television and items on the filtered item list; and
determining a causality score between the marketing content and the items on the filtered item list.

19. The television receiver of claim 15, wherein:
the identifiable items include at least one of a product barcode, trademark, product shape, or product logo.

20. The television receiver of claim 15, wherein the operations further include:
tracking programming output for presentation on the television;
determining a correlation between a type of programming output for presentation on the television and items on the detected item list;
receiving further marketing content based on the correlation; and
outputting a further signal for presentation of the further marketing content on the television during presentation of further programming of the type of programming.

* * * * *